March 22, 1938.    E. ROSS ET AL    2,111,806
UNITARY MOUNT FOR SOUND HEADS
Filed Nov. 5, 1935    3 Sheets-Sheet 1
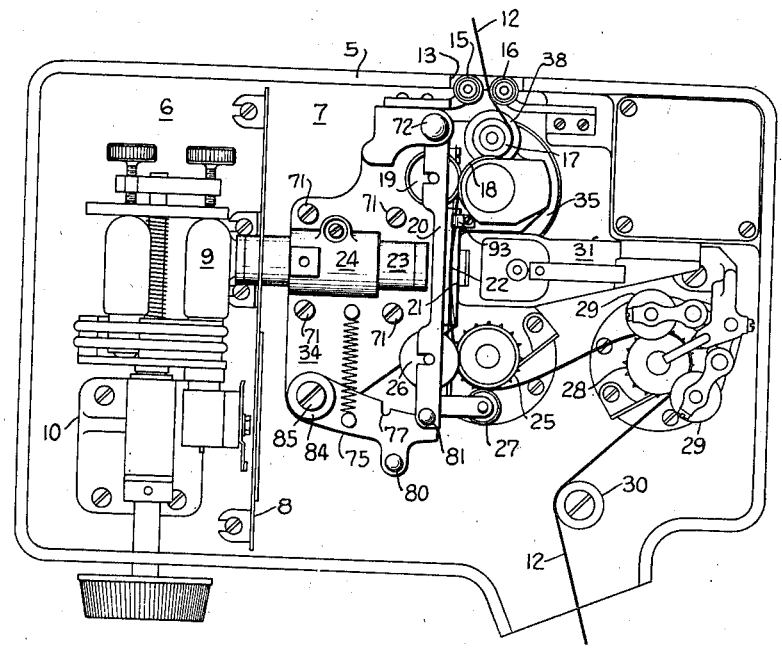
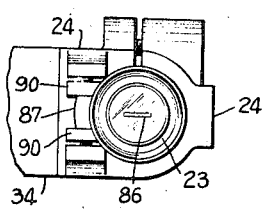
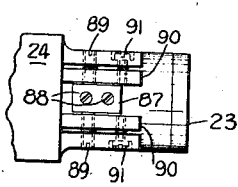
INVENTORS
Ernest Ross
BY Paul Haas
ATTORNEY

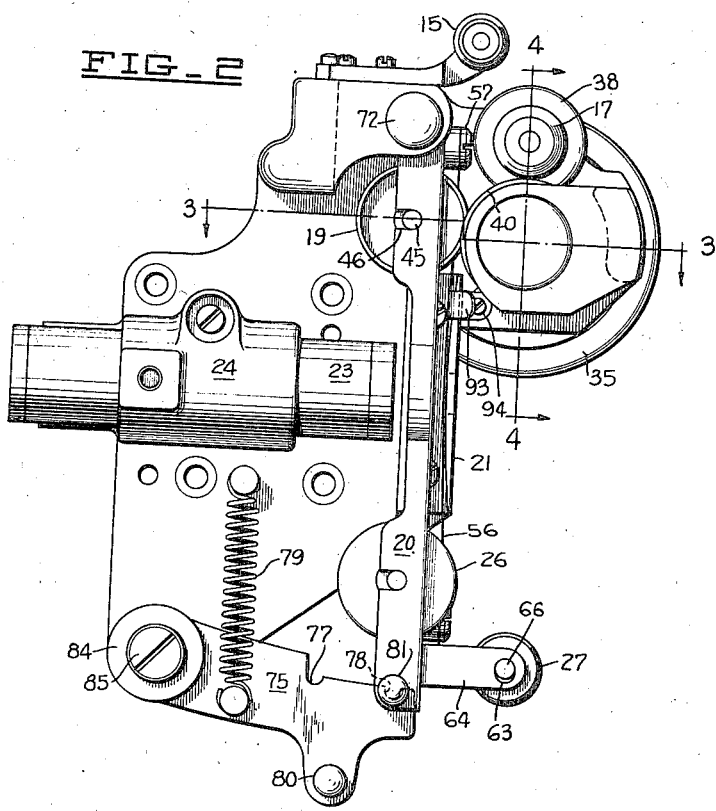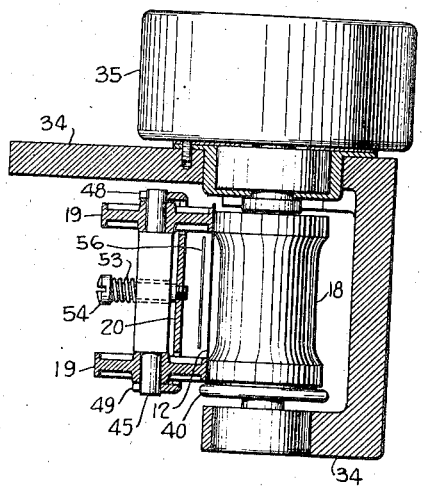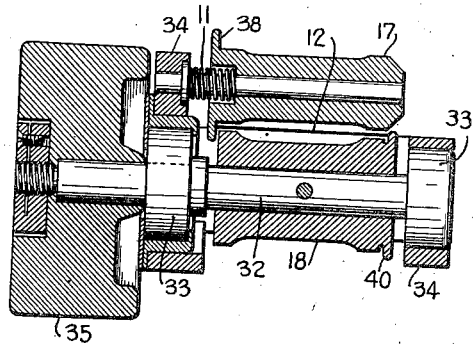

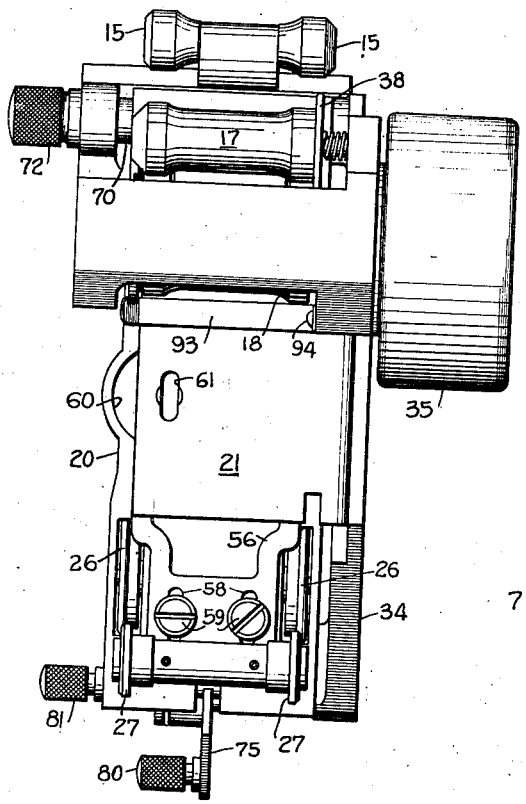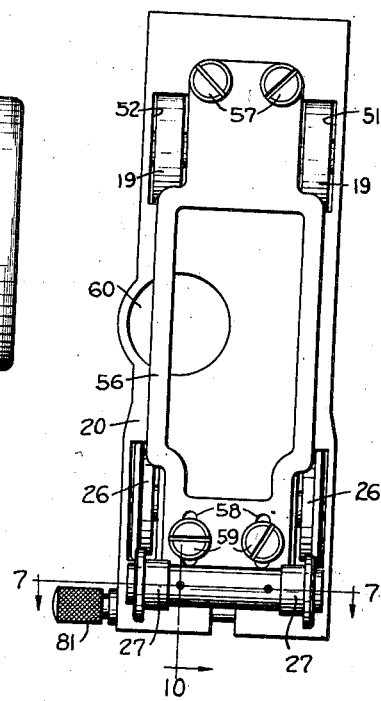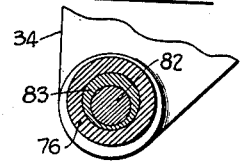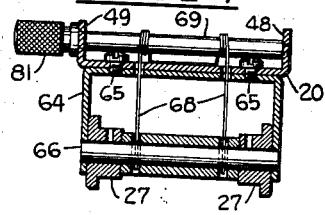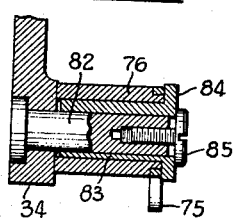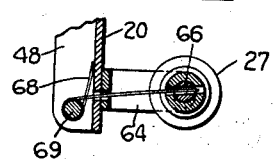
INVENTORS
Ernest Ross
Paul Haas
BY
ATTORNEY Patented Mar. 22, 1938

2,111,806

UNITED STATES PATENT OFFICE 2,111,806

UNITARY MOUNT FOR SOUND HEADS

Ernest Ross, Elmhurst, Long Island, and Paul Haas, Maspeth, Long Island, N. Y., assignors to United Research Corporation, Long Island City, N. Y., a corporation of Delaware Application November 5, 1935, Serial No. 48,278

7 Claims. (Cl. 179—100.3)

This invention relates to talking motion picture systems and apparatus, and particularly to an element thereof which functions to guide the film past a sound translation point.

The present invention is directed to a mounting for an optical system and gate assembly with its associate guide and pressure rollers. The principal object of the invention is to provide a mounting that can be easily and conveniently removed for cleaning or adjusting.

Another object is to provide a unitary mounting for an optical system and gate that can be readily adjusted and checked on a dummy machine before being finally installed in the complete equipment. In sound recording and reproduction, one of the essential adjustments is the focusing of the light beam upon the film. A slit and focusing lens comprise a unit which has a definite relationship with respect to the sound track portion of the film and this adjustment must be accurate in order to obtain a sharp outline of the slit for satisfactory recording and reproduction. The present unit permits this adjustment to be made in a dummy machine in which there is plenty of space for projecting an image of the slit and for making the adjustments to the optical system. When this adjustment is once obtained, the unit is then ready for installation in the finished sound head.

Another object of the invention is to eliminate several variable factors by having pressure rollers and their corresponding rollers incorporated in one unit, where they may be machined to a greater degree of accuracy than would be possible if they were separate units, as has hitherto been the case. By combining the film drive elements such as the guide rollers, pressure rollers and flywheel roller upon a single frame and as a single unit, a more accurate film path is obtained and one which will maintain its accuracy during operation. It is also possible by this construction to eliminate machined surfaces which are to be joined during assembly and thus simplify and produce a more rugged structure.

Still another object of the invention is to facilitate the threading of the film through the gate. The particular arrangement of gate operation for threading the film simplifies this operation and produces when the gate is closed a more accurate relationship between the pressure rollers and drive sprocket and flywheel roller. The pressure rollers on both ends of the gate are mounted to maintain an equalized and constant pressure on the film to aid in stabilizing the speed of the film past the translation point.

Other features of the invention and the invention itself will be more fully understood by reference to the following description read in conjunction with the accompanying drawings, in which Fig. 1 is a side elevational view of a sound reproducing apparatus employing a preferred form of my invention.

Fig. 2 is an enlarged side view of the unitary mount.

Fig. 3 is a sectional view taken along line 3—3 of Fig. 2.

Fig. 4 is a sectional view taken along line 4—4 of Fig. 2.

Fig. 5 is a front elevational view of the unitary mount.

Fig. 6 is a front view of the gate.

Fig. 7 is a sectional view along the line 7—7 of Fig. 6.

Figs. 8 and 9 are cross-sectional views of the gate adjusting mechanism.

Fig. 10 is a sectional view along line 10—10 of Fig. 6; and

Figs. 11 and 12 are rear and elevational views, respectively, of the optical azimuth adjusting means.

Referring to Fig. 1, the sound reproducing apparatus is mounted in a casing 5 having two compartments 6 and 7 separated by a wall 8. In compartment 6, an exciter lamp 9 furnishes constant intensity light when energized from a suitable source of energy (not shown). The exciter lamp 9 is suitably mounted in a holder 10 movably secured to the rear wall of compartment 6. This lamp mounting is disclosed in detail and claimed in co-pending application Serial No. 49,769 filed Nov. 14, 1935.

A film 12 is fed from a supply reel (not shown) into an opening 13 formed in the upper wall of the casing 5, between two guide rollers 15 and 16, around an edge guiding roller 17 and over an impedance roller 18. The film 12 then passes between the impedance roller 18 and spring pressure rollers 19 and thence between a film gate 20 and an aperture shoe or plate 21 past a point 22. Light from the exciter lamp 9 is projected on the film through an aperture in a lens barrel 23, which forms a narrow slit of light horizontally disposed with respect to the film gate 20. The lens barrel 23 is mounted in an adjustable holder 24 and is disclosed and claimed in co-pending application Serial No. 24,832 filed June 4, 1935.

The film then travels between a continuously rotating sprocket 25 and spring pressure rollers 26 and 27 and thence over a hold-back sprocket 28 and pad rollers 29, then over a roller 30 to a take-up reel (not shown). Pad rollers 29 are described and claimed in co-pending application Serial No. 32,841 filed July 24, 1935.

A light sensitive cell mount 31 of the type disclosed and claimed in U. S. Patent 2,031,646 of Feb. 25, 1936, contains a light sensitive cell and is positioned directly in back of the aperture plate 21 to allow the cell to receive the modulated light beam produced by the sound track on the film 12 moving past the sound gate.

Referring now to Figs. 2, 3, 4 and 5, the impedance roller 18 is mounted on an axle 32 journaled in ball bearings 33 on a U-shaped section of a base 34. A flywheel 35 is provided on the axle 32 to smooth out any small variations in rotation caused by variations in either load or power.

An edge guiding roller 17 is cooperatively positioned near the impedance roller 18 so that a flange 38 contacts one edge of the film 12 and forces it against a flange 40 provided on the impedance roller 18. This tends to maintain the film 12 in a constant lateral relationship with respect to the translation point 22, and is helpful in reducing lateral displacement or weave of the sound track. Compression spring 11 forces the roller 17 outwardly to produce this guiding action.

The pressure rollers 19 adjacent the impedance roller 18 are mounted upon the sound film gate 20. In order to insure perfect contact between the rollers 18 and 19, the rollers 19 are constructed so as to be self-aligning. This is accomplished by mounting the ends of the axle 45 of the rollers 19 within grooves 46 provided in rearwardly extending flanges 48 and 49 of the film gate 20. Rollers 19 project through apertures 51 and 52 in the film gate 20 and are resiliently held against the film 12 by a spring 53 when the gate is in a closed position (see Fig. 3). The spring 53 is held in place by a screw 54 which passes through the axle 45 and is fastened to the gate 20.

The lower portion of the gate is provided with another pair of spring pressure rollers 26 which are mounted upon the film gate 20 in a manner similar to the pressure rollers 19. When the gate 20 is in a closed position, the pressure rollers 26 contact and hold the film in engagement with the sprocket 25.

A spring 56 at the front of the gate 20 provides initial tension to hold the film in engagement with the aperture plate 21, the spring conforming with the curvature of the plate. The upper end of the spring 56 is fixedly attached as by screws 57 to the gate 20, but its lower end is free to move by means of slots 58 upon a pair of guides 59 attached to the gate 20. The gate 20 is provided with an aperture 60 to allow the light beam from the barrel 23 to be projected therethrough. The shoe or plate 21 also has a registering aperture 61 to allow the light beam to fall upon the light cell within the cell mount 31.

A pair of pressure rollers 27 are provided at the lower end of gate 20 and are mounted by means of a U-shaped bracket 64 (see Figs. 7 and 10) secured as by screws 65 to gate 20. The bracket 64 is provided with elongated holes 63 through which axle 66 extends. A spring 68 suitably mounted on a rod 69 maintains the rollers 27 against the film 12 passing over sprocket 25 when the gate is closed, as shown in Fig. 1.

The gate 20 is pivotally mounted at its upper end by a pin 70 to a U-shaped section of the base 34, the base 34 being attached to the back wall of casing 5 by screws 71, and also serving as a support for the lens mount 24. In order to remove the gate 20 for cleaning, the pin 70 is provided with a knurled head 72 which may be rotated by hand to remove the pin 70 from the mounting base 34 and thus allow withdrawal of the gate 20.

In order to hold the gate 20 in either open or closed position, a latch member 75 is provided adjacent its lower end. The latch 75 is pivotally mounted by a sleeve 76 to a lower portion of the base 34 (see Figs. 8 and 9). A notch 77 is provided in the upper surface of the latch 75, and is adapted to receive the rod 69 and thus hold the gate in an open position when threading film in the apparatus. Another notch 78 is provided for maintaining the gate in a closed position, as shown in Fig. 2. A spring 79 is provided having one end attached to the latch 75 and the other end to the base 34 to urge the latch upwardly and to maintain the gate either closed or open when set in either position. A knurled handle 80 on the latch 75 and a second knurled handle 81 at the lower end of the gate 20 facilitate the opening and closing of the film gate.

In order to adjust the limit of forward movement of the film gate 20, an adjustable movement is provided which comprises a stud 82 projecting from the base 34 and an eccentric bushing 83 adapted to fit over stud 82 and in sleeve 76 mounted on latch 75. The eccentric bushing 83 is provided with a knurled flanged portion 84 to facilitate rotation and adjustment. A locking screw 85 threadably mounted in stud 82 maintains the adjustment. When the proper forward position is once determined, the gate will always be returned thereto when closed. The open position of the gate is also fixed and removes all pressure rollers and springs from the film path to provide a clear opening to facilitate film threading.

Referring now to Figs. 11 and 12 which show in detail the method of adjusting the optical slit 86 employed in sound motion pictures with respect to a path at right angles to the direction of film travel, a block 87 suitably attached as by means of screws 88 to lens barrel 23 is slidably engaged between two adjustable screws 89 threadably engaged in guides 90 extending from the mounting 24. By adjusting the screws 89, the lens barrel 23 is rotated until the optical slit 86 is at right angles to the longitudinal direction of the sound track on the film 12. Screws 91 are provided for locking the adjustment. This adjusting and locking unit is disclosed and claimed in co-pending application Serial No. 64,106, filed Feb. 15, 1936.

When necessary to thread the film through the apparatus, the latch member 75 is pressed downwards and the film gate 20 backwards until the rod 69 engages in the notch 77 on the latch member 75. This separates the spring pressure rollers 19 from the impedance roller 18, and also disengages the rollers 26 and 27 from the sprocket 25.

To facilitate threading, a convex guide or strike bar 93 is provided which prevents the film 12 from sliding in front of the aperture plate and guides it into its proper position in back of the plate. The strike bar 93 is attached to the base 34 by means of screw 94, and extends forward and over the edge of the aperture plate 21.

It is noted that the base 34 supports the impedance or flywheel roller 18 and flywheel 35, guide roller 17, pressure rollers 19, 26 and 27, and the gate springs and aperture shoe, thus producing a fixed film path not subject to change by any shifting of these elements. Also since the lens and slit assembly 23 is mounted on base 34, the slit may be focused on the film and the lateral adjustment made solely with the unit as shown in Fig. 2, plus a light source. When once accomplished, the entire unit can be installed in the sound head without further adjustment.

What is claimed is:

1. A film unit comprising the combination of a base plate, a flanged impedance roller mounted on said plate, a guide roller mounted on said plate at a predetermined position with respect to said impedance roller and adapted to urge film against the flange of said impedance roller, an aperture plate, a drive sprocket, and a film gate mounted on said base plate having pressure rollers cooperating with said impedance roller and said sprocket.

2. A film unit comprising the combination of a plurality of rollers for guiding film past a translation point, a base plate adapted to support all of said rollers, an impedance roller above said translation point, a drive sprocket below said translation point, a film gate having a pressure roller at each end thereof cooperating respectively with said impedance roller and said sprocket, and means on said base plate for positioning said gate at a predetermined position.

3. A film drive and optical unitary mount comprising a base plate, a flywheel roller, a guide roller cooperating therewith, a drive sprocket, a film gate having pressure rollers cooperating with said flywheel roller and said sprocket, an aperture shoe, and means for positioning said gate at a constant predetermined position with respect to said aperture shoe.

4. A film drive mechanism comprising a drive sprocket adapted to be rotated continuously, a flywheel roller, a guide roller cooperating with said flywheel roller having a flange thereon adapted to maintain one edge of a film in a predetermined position, an aperture plate, a film gate having pressure rollers thereon adapted to maintain said film on said flywheel roller and said drive sprocket, said gate being adapted to remove said pressure rollers from said film when in open position and to exert a constant pressure on said film when said gate is in closed position, and means for predetermining the pressure exerted on said flywheel roller and said drive sprocket when said gate is in closed position.

5. A film drive in accordance with claim 4 in which all of said elements except said drive sprocket are mounted on a common mounting plate.

6. A film unit comprising the combination of a mounting plate, a flywheel roller and flywheel mounted on said plate, a drive sprocket, and a film gate mounted on said plate having rollers cooperating with said flywheel roller and said sprocket, said flywheel roller and gate cooperating to maintain said film at a predetermined position.

7. A film drive unit comprising an impedance roller, a drive sprocket, a gate extending between said roller and said sprocket, and pressure rollers on said gate for maintaining film at a substantially uniform pressure on said impedance roller and said sprocket, said gate being adapted to remove said pressure rollers from said film when in open position.

ERNEST ROSS.
PAUL HAAS.